Patented Nov. 10, 1931

1,831,567

UNITED STATES PATENT OFFICE

FLOYD C. KELLEY, OF SCHENECTADY, NEW YORK, ASSIGNOR TO GENERAL ELECTRIC COMPANY, A CORPORATION OF NEW YORK

USE OF MANGANESE AS A CEMENT FOR TUNGSTEN CARBIDE

No Drawing.   Application filed August 29, 1929.  Serial No. 389,325.

The present invention relates to cemented tungsten carbide and more particularly to the use of manganese as a cementing material for tungsten carbide.

A cemented tungsten carbide is disclosed in the patents to Schroter #1,549,615 and #1,721,416. In the patented disclosures a metal or combination of metals of the iron group is employed as the cementing agent. A combination of tungsten carbide and cobalt for example has been found to give very satisfactory results when employed as wear resisting surfaces or cutting tools.

According to the present invention manganese is employed as the cementing agent for tungsten carbide. I have found that a sintered hard metal composition suitable for use as a cutting tool can be made from a mixture of tungsten carbide and manganese, the manganese acting as the cementing agent. The product obtained is capable of taking a sharp cutting edge and although it is somewhat brittle in character, it is extremely hard and particularly suitable for use in machining materials of an abrasive character. Materials, for example, such as Mycalex, which is the trade name of a composition consisting largely of mica particles and lead borate may be machined only with great difficulty with high speed tool steel. A sintered or cemented composition consisting of tungsten carbide and manganese is capable however of accurately and easily machining such materials.

In carrying out my invention, tungsten carbide and manganese in the proportion of about 91% by weight of tungsten carbide and 9% manganese are mixed together and the powdered materials consolidated to a solid mass by pressing the powdered mixture into a bar and heating it to a sintering temperature as disclosed in the Schroter Patent No. 1,549,615. If desired however the powdered materials may be placed in a mold and subjected to the simultaneous action of heat and pressure, as disclosed in the copending application of Samuel L. Hoyt, Serial No. 181,536. The temperature employed in sintering the material is about 1300° C. The product formed according to any of the above processes may be used as a tool bit and may be brazed, welded or secured in any suitable manner to a tool shank.

Tool bits formed from this composition are characterized by their extreme hardness. For example, the above composition had a hardness of 71 on the Rockwell C scale and scratched glass like a diamond and also scratched cemented tungsten carbide of the character described in Schroter Patent No. 1,549,615.

The amounts of manganese employed with the tungsten carbide may be varied depending upon the character of the tool desired. The hardness will increase or decrease depending upon whether the manganese content in the tool bit is decreased or increased respectively.

What I claim as new and desire to secure by Letters Patent of the United States, is,—

1. A cemented composition consisting largely of tungsten carbide the cementing material in the composition being manganese.

2. A metal cutting tool consisting mainly of cemented tungsten carbide the cementing material being manganese.

3. A sintered metal composition consisting largely of tungsten carbide but containing an appreciable amount of manganese.

In witness whereof, I have hereunto set my hand this 28th day of August, 1929.

FLOYD C. KELLEY.